United States Patent
Lamastra et al.

(10) Patent No.: US 8,443,439 B2
(45) Date of Patent: May 14, 2013

(54) METHOD AND SYSTEM FOR MOBILE NETWORK SECURITY, RELATED NETWORK AND COMPUTER PROGRAM PRODUCT

(75) Inventors: Gerardo Lamastra, Turin (IT); Paolo Abeni, Turin (IT); Gianluca Cangini, Turin (IT); Francesco Coda Zabetta, Turin (IT)

(73) Assignee: Telecom Italia S.p.A., Milan (IT)

( * ) Notice: Subject to any disclaimer, the term of this patent is extended or adjusted under 35 U.S.C. 154(b) by 950 days.

(21) Appl. No.: 12/225,686

(22) PCT Filed: Oct. 31, 2006

(86) PCT No.: PCT/EP2006/010448
§ 371 (c)(1),
(2), (4) Date: Oct. 10, 2008

(87) PCT Pub. No.: WO2007/225686
PCT Pub. Date: Oct. 4, 2007

(65) Prior Publication Data
US 2009/0144823 A1    Jun. 4, 2009

(30) Foreign Application Priority Data
Mar. 27, 2006    (WO) ................. PCT/EP2006/002787

(51) Int. Cl.
*G06F 12/14*    (2006.01)
(52) U.S. Cl.
USPC ................... 726/22; 726/23; 726/24; 726/25; 713/188
(58) Field of Classification Search ................ 726/22–25
See application file for complete search history.

(56) References Cited

U.S. PATENT DOCUMENTS 5,440,723 A * 8/1995 Arnold et al. ................ 714/2
6,971,019 B1 * 11/2005 Nachenberg ................ 713/188
(Continued)

FOREIGN PATENT DOCUMENTS
GB    2 353 918 A    3/2001
GB    2 359 908 A    9/2001
WO    WO 03/012644 A1    2/2003

OTHER PUBLICATIONS

Kuwatly et al, "A Dynamic Honeypot Design for Intrusion Detection," 2004, IEEE, pp. 1-10.*

(Continued)

*Primary Examiner* — Luu Pham
(74) *Attorney, Agent, or Firm* — Finnegan, Henderson, Farabow, Garrett & Dunner, L.L.P.

(57) ABSTRACT

A honeypot system for protecting a mobile communication network against malware includes one or more user-less mobile devices including a monitoring module for monitoring the events conveying software applications in the associated mobile device as well as a controller client module that emulates human-like interaction with the user-less devices as a function of the events monitored. The system controllably performs, for the applications conveyed by the events monitored, one or more of the following steps: i) installing the application on the device; ii) executing the application installed on the device; and iii) de-installing the application from the device. After any of these steps, the state of the device is checked in order to detect if any anomalous variation has occurred in the state of the device indicative of the device being exposed to the risk of malware. If any anomalous variation is detected, the system issues a malware alert message.

23 Claims, 4 Drawing Sheets

U.S. PATENT DOCUMENTS

| | | | |
|---|---|---|---|
| 7,010,698 B2 * | 3/2006 | Sheymov | 713/194 |
| 7,464,407 B2 * | 12/2008 | Nakae et al. | 726/22 |
| 7,752,432 B2 * | 7/2010 | Sheymov | 713/151 |
| 2002/0116635 A1 * | 8/2002 | Sheymov | 713/200 |
| 2002/0184528 A1 * | 12/2002 | Shevenell et al. | 713/201 |
| 2003/0149867 A1 * | 8/2003 | Park et al. | 713/1 |
| 2003/0219008 A1 | 11/2003 | Hrastar | |
| 2004/0111636 A1 * | 6/2004 | Baffes et al. | 713/201 |
| 2004/0172557 A1 * | 9/2004 | Nakae et al. | 713/201 |
| 2005/0050335 A1 * | 3/2005 | Liang et al. | 713/188 |
| 2005/0166072 A1 * | 7/2005 | Converse et al. | 713/201 |
| 2005/0210534 A1 | 9/2005 | Krishnamurthy | |
| 2006/0018466 A1 * | 1/2006 | Adelstein et al. | 380/46 |
| 2006/0161982 A1 * | 7/2006 | Chari et al. | 726/23 |
| 2006/0212723 A1 * | 9/2006 | Sheymov | 713/194 |
| 2006/0288414 A1 * | 12/2006 | Kuroda | 726/24 |
| 2007/0123216 A1 * | 5/2007 | Cantini et al. | 455/411 |
| 2007/0209075 A1 * | 9/2007 | Coffman | 726/23 |

OTHER PUBLICATIONS

Housel et al., "Emulator Express: A System for Optimizing Emulator Performance for Wireless Networks," 2000, IBM Systems Journal, pp. 384-401.*

Holz et al., "Detecting Honeypots and Other Suspicious Environments," 2005, IEEE, pp. 29-37.*

Dysko et al., "Web Services Based Distributed Dynamic Protection System Simulation and Testing," 2004, University of Stratheclyde, U.K.*

Spitzner, "Definition of Honeypots"; Honeypot: Tracking Hackers, Addison-Wesley Professional, p. 40, (2002).

* cited by examiner

METHOD AND SYSTEM FOR MOBILE NETWORK SECURITY, RELATED NETWORK AND COMPUTER PROGRAM PRODUCT

CROSS REFERENCE TO RELATED APPLICATION

This application is a national phase application based on PCT/EP2006/010448, filed Oct. 31, 2006.

FIELD OF THE INVENTION

The invention relates to the area of mobile (e.g. cellular phone) network security. The invention was devised with specific attention paid to its possible use in identifying malware (i.e. software designed to infiltrate and/or damage a computer system without the owner's informed consent such as e.g. viruses, worms, Trojan horses, spyware, and various means for exploiting network vulnerabilities) capable of infecting or targeting a mobile device.

DESCRIPTION OF THE RELATED ART

Modern cellular phones (cellphones) are similar to standard personal computers: they provide advanced functionalities such as e-mail and multimedia messaging, personal contact management, document reading, picture and message recording. They also provide advanced mechanisms to connect to data networks, so that they virtually support any form of electronic transactions supported by ordinary computers. Additionally, mobile terminals give access to the credit stored in the SIM (Subscriber Identification Module), i.e. the hardware token, usually in the form of a smart card, that contains the identity of the customer and associates the customer and the telecom provider thus permitting the customer to use the cellular phone network.

Consequently, a mobile device such as a cellular phone is an ideal target for electronic attacks that can disrupt functionalities of both the mobile device and the network itself.

Conventional security measures cannot provide adequate protection since many of the threats that target mobile devices cannot be prevented using standard Intrusion Detection Systems (IDSs) and firewalls.

Anti-virus solutions have been adapted to the context of mobile terminals, but they are only effective against well-known viruses; moreover, anti-viruses require continuous update to keep the pace with the real world threats. They are also ineffective for the protecting a terminal from attacks that directly target applications, such as buffer overflow or race conditions.

Vendors are starting to implement other host-based security systems that work directly on a mobile terminal; however, this approach has also some strong limitations.

Firstly, a host-based security system drains resources from the mobile terminal, which is inevitably resource-constrained; this may result both in reduced computing performance and in reduced battery life.

Additionally, personal information may be accessed and stolen before the host-based security subsystem is able to identify the phenomenon; although mobile terminals have sophisticated capabilities, their operating systems are not yet capable of implementing mechanisms of privilege separation; hence, the malware could also disrupt or kill the host-based security system without the user becoming aware of this.

More generally, various arrangements are known in the area of communications to implement so-called "sandboxed" environments. A sandboxed arrangement can be effectively used to identify the malware during its early propagation stages, without involving a device that is explicitly owned or used by a real person: for instance, the idea of using "honeypot" devices that do not really provide any useful service, but are just baits for attackers has been widely deployed in the context of traditional Internet servers.

According to a standard definition as provided e.g. by L. Spitzner in "Honeypot: Tracking Hackers", Addison-Wesley Professional, Oct. 9, 2002, page 40, a honeypot is "a resource whose value lies in unauthorized or illicit use of that resource". Usually honeypots are implemented using a system that can capture all the traffic directed to unused subnet addresses and emulate the behavior of real, vulnerable servers.

Various documents address the use of "honeypots" and "honeynets".

For instance, US-A-2003/0219008 discloses a honeypot used in the context of wireless LANs in order to capture an intruder and constrain it on a radio channel different from the remaining part of the network, which is switched onto another channel.

PCT application WO-A-03/012644 describes the implementation of an anti-virus system suited for mobile cellphones and Personal Digital Assistants (PDAs). This anti-virus arrangement operates by scanning all the files present on the local store that may potentially carry an infection. Basically, it intercepts each operation related to file access, by hooking the relevant system calls of the operating system, and compares the content of the file with a set of well-known patterns.

US-A-2005/0210534 details another example of honeypot aiming at tackling with Internet Address Mobility features by moving the honeypot by changing its IP address.

OBJECT AND SUMMARY OF THE INVENTION

The Applicants have observed that the prior art arrangements discussed in the foregoing are not exempt from drawbacks and problems related to their use:

for instance, the design of a honeypot as disclosed e.g. US-A-2003/0219008 is based on the need of emulating a wireless access point, which acts just like a network server providing support for wireless-to-wired network switching;

those arrangements such as disclosed e.g. in WO-A-03/012644, which operate by scanning all the files present on the local store that may potentially carry an infection, must be inevitably aware of various details of the malware: this information is usually encoded in signature strings which must be updated each time new malware is identified;

other arrangements, such as disclosed e.g. in US-A-2005/0210534, share with other prior art the inherent limitations that arise as a result of a honeypot being used essentially as a server in those contexts where mobility refers to the logical capability of user-based terminals (cellphones) of using different IP addresses at different times without losing active connection.

The Applicants have thus tackled the problem of providing a honeypot arrangement for use in a mobile communication network that:

dispenses with the need for the honeypot to emulate a wireless access point and/or to act just like a network server;

does not require that the honeypot be extensively aware of details of malware; and does not exhibit any limitations related to user mobility.

The Applicants have found that this problem can be solved by means of a method having the features set forth in claim 1. Advantageous developments of the inventions are called for in the subclaims. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus a method for protecting a mobile communication network against malware by means of a honeypot function by monitoring, in at least one mobile device operatively connected to said network, events conveying software applications on said at least one mobile device. Possible events conveying software applications may be the reception of a text message containing a URL, a multimedia message or any executable content received through e.g. the mobile communication network or a short/medium range connection (Bluetooth™, Wi-Fi, Wi-Max). A set of anomalous variations in the state of said at least one device is defined, wherein the anomalous variations in said set are indicative of said at least one device being exposed to the risk of malware. A human-like interaction with said at least one device is emulated as a function of said events monitored, wherein said human-like interaction includes controllably performing, for the applications conveyed by said events monitored, at least part of the sequence including the steps of i) installing the application on said at least one device; ii) executing the application installed on said at least one device; and iii) de-installing the application from said at least one device. After any of the steps performed in said sequence, the state of said at least one device is checked to detect if any of said anomalous variations included in said set has occurred in the state of said at least one device. If any said anomalous variation is detected, a malware alert message is issued.

In general a mobile communication network is intended herein as a radio network made up of a number of cells each served by a fixed transmitter, e.g GSM, GPRS, UMTS, CDMA, TDMA, WiFi, WiMax, etc.

The term "software application" or "application" refers in general to a machine readable sequence of instructions which can be executed on a device.

The following is an exemplary list of anomalous variations suitable for inclusion in said set:

an application installed in said at least one device leads to the application overwriting existing files of other applications, and/or to the application being re-executed at each booting of said at least one device;

an application executed on said at least one device leads to the application invoking processes other than the executing processes, the application accessing the SIM of said at least one device, the application accessing the address book of said at least one device, the application causing either of messages or calls or both to be issued automatically from said at least one device, and/or the application prompting a Bluetooth session; and an application being de-installed from said at least one device leads to the state of said at least one device after de-installation being different from the state of said at least one device prior to installation of said application.

Those of skill in the art will promptly appreciate that the set of anomalous variations is an open set, in that such set may include fewer or more variations and/or variations different from those listed in the foregoing—just by way of example. The number and types of anomalous variations considered may in fact vary e.g. as a function of the expected characteristics of malware to be detected and/or to the possible availability in the network of other malware sentinels/probes.

The open nature of the set of anomalous variations considered also explains why the human-like interaction provided in the preferred embodiment of the arrangement described herein may include controllably performing even only partly the sequence of installing an application, executing the application installed and de-installing the application: in fact, just by way of example, certain anomalous variations can be detected immediately after the application is installed (without the need of executing it), while other anomalous variations can be detected only after an installed application is executed (before the application is de-installed). Still other anomalous variations can be detected by merely de-installing an application just installed (again, without the need of executing it). Preferably, the sequence is performed (irrespective of whether in full or just partly) controllably, i.e., with the possibility of rendering the performance of a given step conditional on the outcome of the previous step(s).

Similarly, it will be appreciated that these anomalous variations are generally indicative of the network being exposed to the risk of malware (i.e. of a "suspected" malware attack) and do not necessarily represent evidence of the network protected being actually attacked by malware. In fact, one or more of these anomalous variations may eventually turn out to be generated by a thoroughly benign application. The malware alerts possibly generated are thus "weighed", e.g. correlated with other possible alerts related to the same application. The specific criteria for performing such weighing of alerts in order to generate a malware alarm proper depend on a number of factors (e.g. the expected characteristics of malware to be detected and/or other malware sentinels/probes being possibly available in the network) and fall outside the scope of the instant description.

The arrangement described herein makes it possible to provide an improved honeypot arrangement for use in a mobile communication network where:

the need for the honeypot of emulating a wireless access point and/or to act just like a network server is dispensed with;

the honeypot must not be extensively aware of details of malware;

no appreciable limitations arise related to user mobility;

the possibility exists of using with full advantage a mobile client honeypot as a stand-alone system.

In the preferred embodiment of the arrangement described herein, the honeypot is used to emulate a client terminal and acts just like an average user, which receives and executes any possible application, including those provided by malevolent attackers using Bluetooth connection, MMS application delivery or some other source. This type of operation does not require that the honeypot should be aware of, say, how text strings are encoded, how specific files are placed in the mass storage, and/or how files are internally arranged. This optimizes the scan process and reduces the overhead associated therewith.

The "sandbox" mechanism implemented in the arrangement described herein shares with conventional anti-virus systems the need of intercepting some of the actions performed on the host operating system. However, while conventional anti-viruses are based on pattern matching and on the precise identification of a threat, the analysis logic deployed in the mobile client honeypot arrangement described herein is based on the Anomaly Detection paradigm and is more focused on identifying any suspect behavior, including those characterizing legitimate applications.

In contrast to anti-viruses that work passively, i.e. by waiting for a malevolent application to be installed or run in the terminal, the mobile client honeypot arrangement described takes an active part in the analysis of applications, and automatically installs and interacts with each application that reaches the terminal.

The arrangement described herein thus reverses the conventional usage pattern, by making the honeypot a client machine.

It will be appreciated that transposing this pattern from the conventional Internet world is far from straightforward as it requires the implementation of a sandbox suitable for use in a mobile terminal as well as implementing proper user-emulation logic.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

Figure 1:
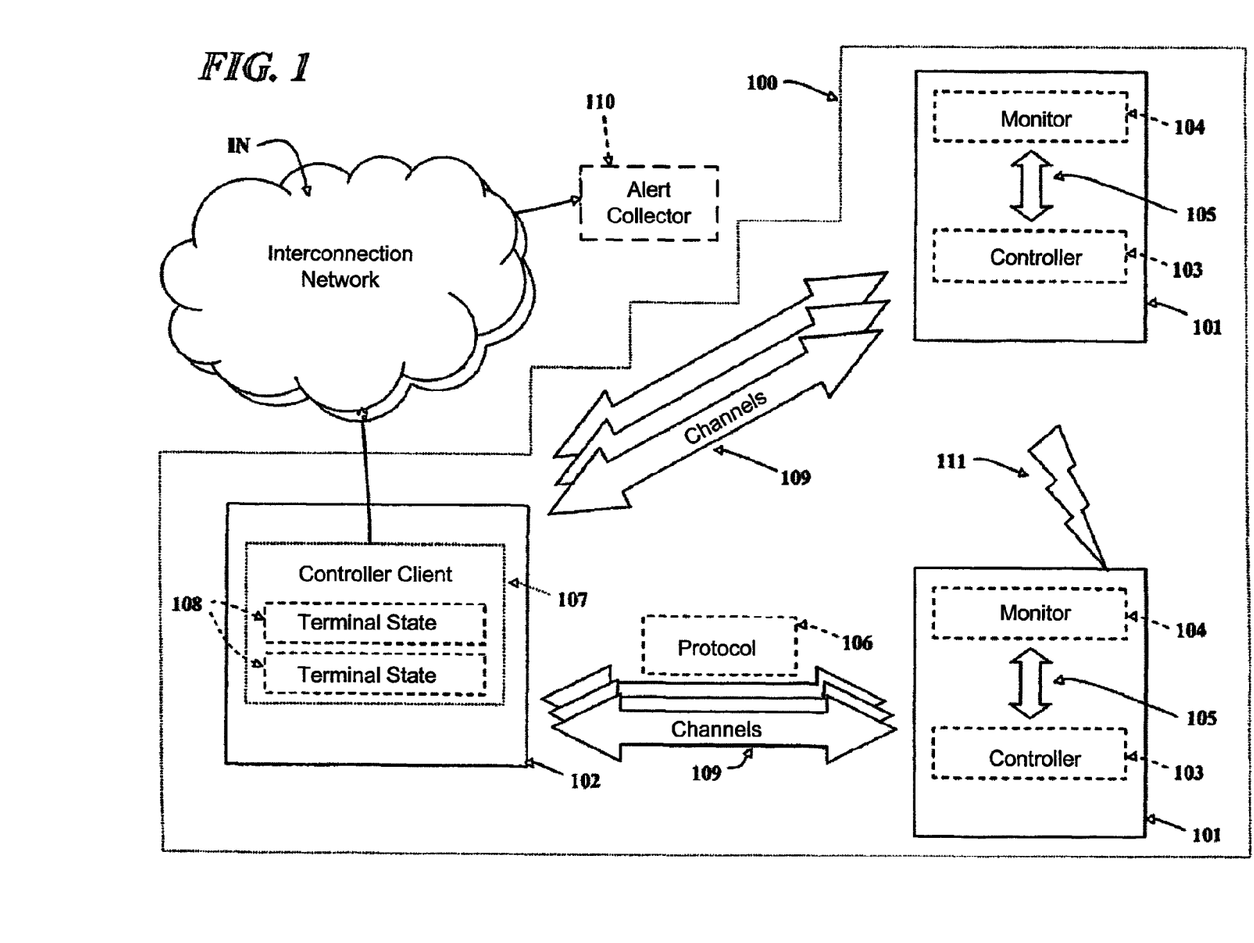
FIG. 1 is a block diagram generally representative of the architecture of the arrangement described herein.

FIG. 1 shows an exemplary architecture of a Mobile Client Honeypot (MCH) 100.

The honeypot 100 described herein is suitable for use in the context in any type of mobile communication network, both in the form of a stand-alone module and in the form of a module or component that co-operates with other modules or components in protecting a mobile communication network against malware.

The honeypot 100 includes one or more mobile devices or terminals 101 (e.g. cellphones or the like, possibly supporting an external Bluetooth™ or other short range connection 111), operatively connected to the mobile communication network, and a computer host 102. Each mobile device 101 is connected to the host 102 using one or more channels 109. These channels may be based on various technologies, such as Bluetooth™, USB, GPRS, WiMax or Wi-Fi depending on the capabilities of the mobile device 101.

Two software components are installed in the mobile device 101: a controller 103 and a monitor 104. These two components may be implemented within a single process, or two different threads of executions.

Another component, designated controller client 107, is installed on the computer host 102 and is able to communicate directly with the controllers 103 of the terminals 101 using one of the available channels 109. The controller client 107 is also connected through an interconnection network IN to an alert collector 110. The alert collector 110 collects all the alerts generated by the honeypot 100 and allows the operating process of the honeypot to be monitored by a human operator.

In each mobile device 101, the monitor 104 intercepts all the events associated with the associated device and tracks its state changes. The mobile devices 101 included in the honeypot 100 are "user-less" (i.e. have no real users behind them): so it is possible to assume that any event that occurs on a device 101 is "suspect" by definition. The controller 103 collects all the events generated by the monitor 104, and sends them to the controller client 107, which emulates a human-like interaction with the device. Whenever an event raises an alert, the relevant information is sent to the alert collector 110. Alerts can be currently generated by the monitor 104, the controller 103 or the controller client itself.

The communication between the monitor 104 and the controller 103 is usually implemented by using the native IPC (Integrated Process Control) mechanism 105 available in the mobile device. In the preferred embodiment, the monitor 104 and the controller 103 are two distinct processes, so as to reduce the coupling between them and make the overall system more robust.

Each alert originated by the monitor 104 is synchronously transmitted to the controller 103 and typically contains the following information:

- a timestamp, which refers to the instant of time when the alert was originally triggered;
- a unique identifier;
- the alert type; by way of non limiting example, possible alert types may include sending and/or receiving an MMS/SMS/Bluetooth message, installation and/or removal of an application, installation and/or removal of a process that starts at boot, etc.

Each alert may contain one or more extra payloads; each payload has a binary structure comprised e.g. of a payload type, a payload length and zero or more content bytes. Possible payloads include application name (within alerts indicating installation/removal of application), message-content, etc.

The communication between the controller 103 and the controller client 107 is based on a specific protocol 106, which exploits the communication channel 109 and allows the client controller 107 to receive all the alerts generated by the monitors 104. At the same time, the protocol gives the client controller 107 the complete control of the mobile terminals 101; specifically, the client controller 107 can read and write signals in the mobile terminal file-system, manage all the process running on the terminal, query the terminal state and perform a soft-reset.

The client controller 107 also maintains information as to the state 108 associated with each mobile terminal that is connected to the controller client 107.

Several operating systems (OSs) designed for mobile terminals are of the single-user type and do not implement any privilege separation or process isolation mechanism, so that each process running thereon may execute arbitrary operations on the terminal itself. The honeypot 100 exploits this capability to control the terminals 101 by mapping all the relevant OS functionalities on specific messages of the protocol used for the communication between the controller 103 and the controller client 107. This allows a complete separation of the control mechanism and the control logic, which can be implemented more efficiently in the external host 102 that has a much greater computational power. Moreover, this makes the controller client 107 independent of the architecture of the mobile terminals 101.

In the preferred embodiment, the protocol 106 allows sending asynchronous messages (typically, alerts) from the controller 103 to the controller client 107 and supports synchronous communication where the controller client 107 is the initiator, and the controller 103 is the responder. The synchronous communication paradigm is used to send commands from the controller client 107 to the controller 103. These messages always require an explicit response, while asynchronous messages from the controller 103 are not acknowledged in any way.

All protocol messages include binary header that specifies the message type and length, followed by a binary content.

By way of non-limiting example, possible messages may include:
- login;
- alert (generated by the monitor 104, passed to the controller 103 and sent to the controller client 107);
- event (generated by the controller 103, after a terminal state change, and sent to the controller client 107);
- command (sent from the controller client 107 to the controller 103);
- command response (sent from the controller 103 to the controller client 107 after a command has been processed).

Figure 2:
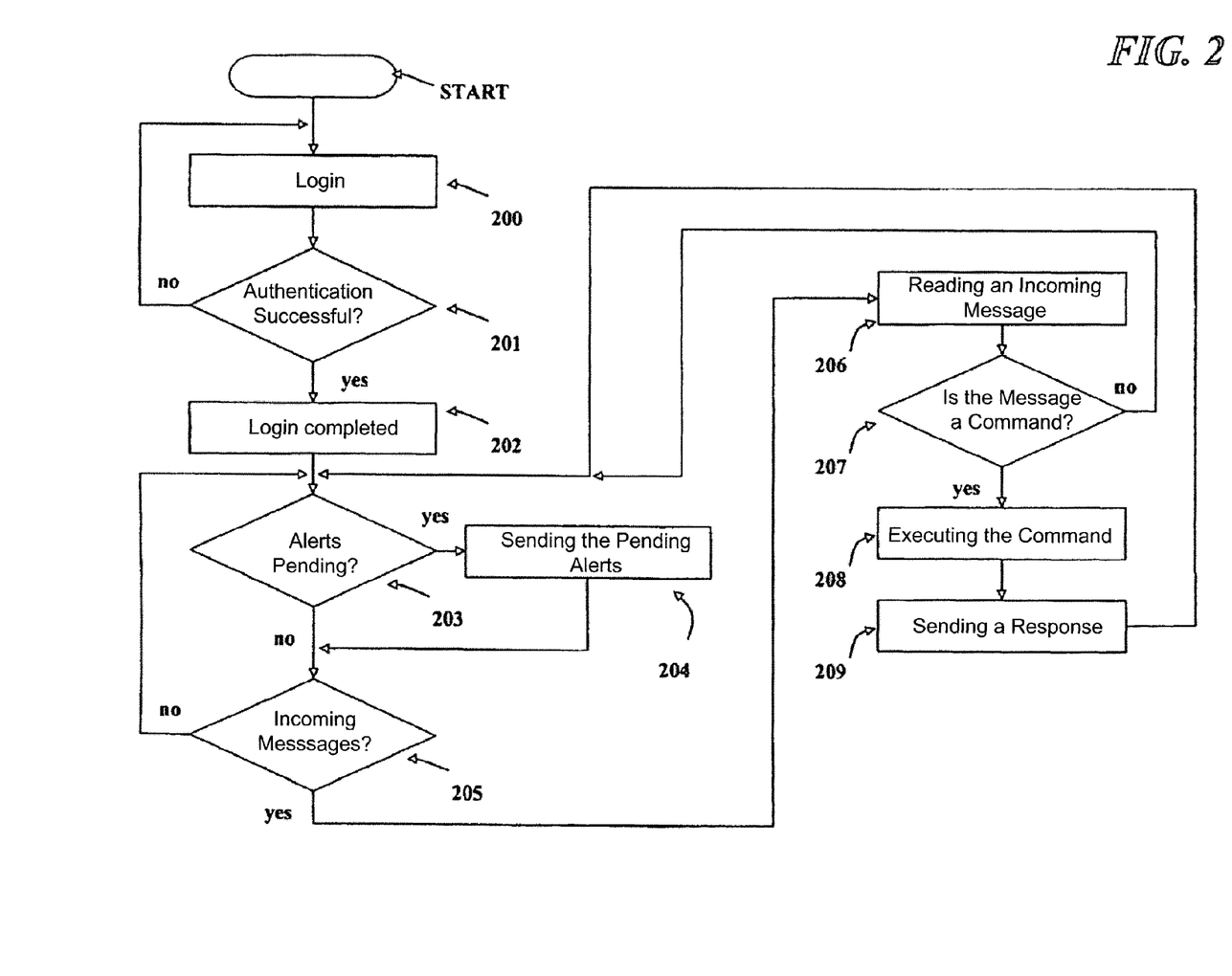
FIGS. 2 to 4 are flow charts that illustrate the mode of operation of the arrangement of FIG. 1.

FIG. 2 describes the protocol 106 as seen from the controller perspective.

After a START step each communication initiates with a login command 200, which the controller client 107 sends to the controller 103 to authenticate itself. The ensuing authentication step 201 can be implemented using a login/password mechanism, a challenge/response or digital certificates; if authentication fails (negative outcome of step 201), the controller 103 terminates the connection, and waits for another incoming request. Authentication may be optional when the communication channel cannot be accessed by others, such as in the case of a USB connection.

After the login completes (step 202), the controller 103 can start sending alerts or events, while the controller client 107 can start sending commands. If there are alerts pending (which corresponds to a positive outcome of a step 203), in step 204 the controller 103 sends them immediately.

Concurrently (i.e. if the step 203 yields a negative outcome or after the step 204), a check is made in a step 205 as to whether any incoming message (command) from the controller client 107 exists waiting to be processed.

If no such message exists (negative outcome of the step 205), the process returns upstream of the step 203.

If the step 205 yields a positive outcome, in a step 206 the controller 103 reads the message pending, and tests (in a step 207) if the message is well formatted e.g. is command.

In the presence of a negative outcome of the step 207, the process returns upstream of the step 203.

If the step 207 yields a positive outcome (namely the message corresponds to an accepted command), the command is executed locally in a step 208. The result of the execution is wrapped in a response packet, and the response is sent in a step 209.

By way of simplicity, the presently preferred embodiment of the protocol 106 does not allow parallel processing of multiple commands; each command is first acknowledged with a response, and only after the response has been received, the controller client 107 can send another command. However, as alerts are sent asynchronously, the controller client is configured to receive them anytime during the life of a connection.

Typically, alerts and events have the same binary structure, which is identical to the data exchanged between the monitor 104 and the controller 103. Commands from the client controller 107 have a textual content, while responses contain a result code that indicates whether the command completed successfully or not.

Preferably, the commands are similar to Unix shell commands and include the following items:
- Ps: gives the list of running processes and threads;
- Ls: lists the content of the current directory;
- Cd <directory>: navigates the directory structure;
- Cat <file>: display the content of a file on the mobile terminal file-system;
- Write <filename> <binary content>: write the binary content passed as argument in a file on the mobile terminal file-system;
- Rm <file>: deletes a file from the mobile terminal file-system;
- Mv <file1> <file2>: moves or renames a file on the mobile terminal file-system;
- Kill <process>: terminates a running process;
- Reboot: soft reboot of the terminal;
- Run <file>: starts an application;
- Install <file>: installs an application contained in an installation files;
- Uninstall <Application>: uninstall the application from the local file-system.

If a mobile terminal 101 becomes unresponsive, a soft reset is usually sufficient to restore a safe and working condition. After a reboot, the monitor 104 and the controller 103 are automatically activated during the boot stage. They are preferably stored in an external memory card, which is physically write-protected so to prevent any possible modification of the software.

The currently preferred embodiment, based on a Symbian™ platform, exploits the so called "recognizer" mechanism to activate the application at boot. Recognizers are also stored in a write-protected directory that cannot be modified by malicious application. As the controller 103 is immediately activated after startup, the controller client 107 can immediately take control of the mobile terminal 101 and restore the original content of the file-system.

In certain situations, a terminal may not be promptly reset and restored in a stable state. This may occur as a result of the a missing privilege separation mechanism or because of faulty software components present in the terminal. In this case, a hard reset is issued command. To that effect, the client controller 107 has access to external hardware (not shown in detail in FIG. 1), connected through the serial port that controls a switch connected to the battery of the mobile terminal. By temporarily disabling the battery and then switching on the mobile device 101 again, it is possible to recover the mobile terminal from almost any possible software fault.

It is also possible to obtain a complete recovery of the initial condition, by issuing a special control sequence to the mobile terminal. For example, some Symbian™ terminals can be restored to the "factory" conditions by simultaneously pressing the 'Answer-to-Call', '#', and '3' keys during reboot. Other mobile terminals have usually other special control sequence. The external switch and the mobile terminals can be modified accordingly so to implement this special condition when needed.

In experiments performed so far by the Applicants conditions that cannot be recovered using soft reset techniques, an external switch and a write-protected external memory were de facto never encountered.

The controller client 107 has the full control of the mobile terminal 101 and can emulate the behavior of a human user interacting with the mobile terminal 101 to "facilitate" the infection attempts by hostile software. Moreover, the controller client 107 can also exploit its greater computational capabilities to execute a deeper and better analysis of the received messages.

By definition of honeypot, any message or activity that involves such a resource is suspect, i.e. are indicative of the existence of the risk of being infected by malware.

The honeypot 100 described herein is configured for monitoring, via the monitors 104, the events associated with operation of one or more mobile devices 101 operatively connected to the network to be protected against malware. Operation of the honeypot 100 described herein is based on the definition of a set of anomalous variations in the state (file-system, list of executing processes, resources utilized) of the devices 101.

An exemplary list of anomalous variations to be included in such a set (which is stored in the controller client 107) is provided in the introductory portion of this description. These anomalous variations are "suspect" in that they are indicative of the network being possibly exposed to the risk of malware. The controller client 107 emulates a human-like interaction with the devices 101 as a function of the events monitored by the monitors 104. Specifically, for the applications conveyed by the events monitored, one or more of the following steps are performed in sequence under the control of the controller client 107:

the application is installed on the device 101;
the application installed is executed on the device 101; and
the application is de-installed from the device 101.

After any of the steps performed in said sequence, the state of the device 101 is checked ("integrity check") to detect if any of the anomalous variations considered in the foregoing has occurred in the state of the device 101. If an anomalous variation is detected, a malware alert message is issued.

As already described, the sequence of installing an application, executing the application installed and de-installing the application may be performed only partly e.g. in the case of those anomalous variations that can be detected without the need of executing and/or de-installing the application.

Oftentimes, in order to better understand what hides behind the first step of a suspected attempted attack, some interaction is required. Some exemplary cases of interaction in specific contexts are now described.

If a message received contains a URL, the controller client 107 can directly follow the URL, using a spider-like approach, and search for executable content. By using its own network connection, the controller client avoids issues related to restricted bandwidth or improper URL management offered by the local browser of the mobile terminal 101. Whenever an executable content is identified, the controller client 107 can fetch it, copy it on the mobile terminal 101 and then install it. Of course, if the message already contains an installable application, the controller client 107 can extract it from the message for further analysis. All these events are signaled by the controller 103 by means of alerts.

The short-range Bluetooth connection (as exemplified at 111 in FIG. 1) is another possible source of infection. Attacks through Bluetooth channels can be facilitated by relaxing the Bluetooth protection profile and using easy-to-guess PINs. For example, if an external device tries to execute a pairing operation, the controller 103 will send an event that notifies the Bluetooth Connection request. The controller client 107 can then send a command to the controller 103, e.g. to use a 0000 PIN.

Alternatively, if the connection fails (because the other peer cannot guess the PIN), the controller client 107 can request the controller 103 to disable the pairing for this incoming request. When the connection has been successfully established, the monitor 104 will analyze the behavior of the Bluetooth subsystems and reports service inquiry operations (which are usually performed done to identify the services available), attempts to use the modem service (which can allow the attacker to issue a phone call, send SMS messages, and also fetch contacts from the SIM), attempts to perform an OBEX Push, which results in a message being delivered to the mobile terminal 101. OBEX Push is a communication protocol (usually implemented on the top of Bluetooth or Infra-Red low-level communication stack) that allows a sender to transmit a binary content to a single receiver.

Whenever an installable application is received, through one of the available channels (MMS, SMS containing links, Bluetooth OBEX Push), the controller client 107 scans it to check whether the application has already been processed or not.

If the application is unknown, the controller client 107 puts it in the queue of the applications to be tested. Application identification can be based on some form of cryptographically secure hashing, typically MD5 or SHA-1, or on more advanced pattern recognition techniques, as typically performed by antivirus products.

Each application in the queue is processed in isolation; the controller client 107 first analyzes the internal structure of the installable application, identifying the files and the directories that will be created or modified as a consequence of the installation process. Moreover, the Controller Client can also scan each executable component of the application for specific system libraries and functions, so to identify potentially dangerous behaviors.

These functions are usually stored in a system-dependent "black list". Possible examples include, but are not limited to: the Bluetooth API (Application Programming Interface), the Socket API, the telephony API, the Start-on-Boot API, etc. If one of these APIs is present in the analyzed application, an alert is issued and sent to the alert collector 111.

After the first analysis stage, the application is sent to the controller 103, and then installed directly on the mobile terminal 101. The monitor 103 generates an alert when the installation completes successfully, and the alert is forwarded to the alert collector 110. From now on, all the alerts that are generated by the monitor 104, the controller 103 or the controller client 107 are tagged with the identification number associated with the specific alert. This makes it possible to easily correlate alerts that refers to the application under analysis.

After the installation, the controller client 107 runs an integrity check to assess whether the application has caused an anomalous variation in the state of the terminal 101, i.e. whether the application has modified in an unexpected way the file-system, the list of executing processes and/or the resources utilized by the mobile terminal 101. The controller client 107 does this by comparing the observable effects of the installation with the information collected during the initial analysis of the installable application. If there is a difference (i.e. an anomalous variation), this means that the application installation had some hidden side-effects, and the controller client 107 issues an alert that contains the difference (file names and related contents or process names). The integrity check is implemented by maintaining the state 108 associated with each mobile terminal 101 that is connected to the controller client 107.

Figure 3:
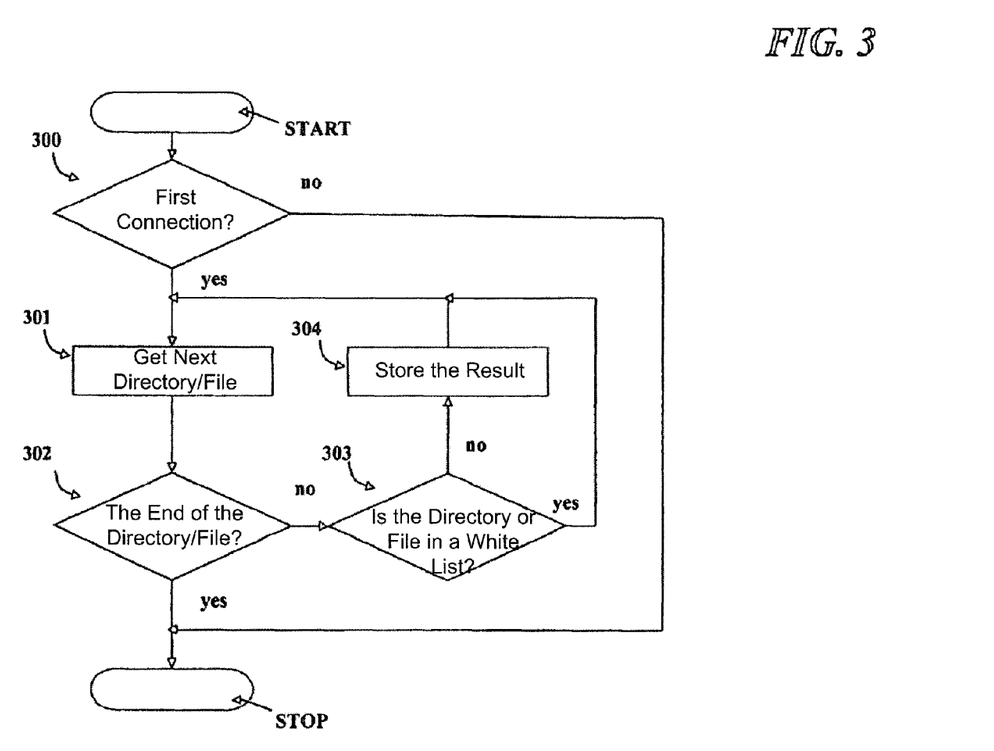

The flow chart of FIG. 3 is exemplary of a possible implementation of the process just described.

After a START step, a check is performed in a step 300 as to whether this is the first connection between the controller client 107 and the controller 103.

In the negative, the process evolves directly to a STOP step.

A positive outcome of the step 300 (first connection) triggers a complete analysis of the local file-system (FS). The analysis starts in the root directory and continues recursively in a directory tree including a "get next directory/file" step 301 and a step 302 wherein a check is made as to whether the visit to the file-system is completed or not.

Specific directories or files (for example, C:\TEMP) are excluded from the analysis using a white-list check 303 so to reduce false-positives associated with temporary files or file-system elements that are not under direct control of the application (for example, the local message store). The result of the file-system scan is then stored (in a step 304) in the host computer 102 by the controller client 107. For each file and directory, the analysis collects name, attributes, creation and modification time, dimension and content. All the information may possibly be compressed to reduce the needed space, or can be optimized to reduce the time required for performing a check. The content data is usually processed using a cryptographically secure hash function such as e.g. MD5 or SHA-1. When the controller client 107 needs to perform an integrity check, the procedure is repeated and the collected data is confronted with the data stored on the host.

After executing the file-system integrity check, the controller client 107 runs an analogous operation on the set of running processes; any difference in the process or thread set is noticed and an alert is issued containing the list of all the differences thus identified. The controller client 107 maintains all the information recorded in the internal state 108.

After the first connection has been completed, the controller client 107 gets the complete list of processes and threads; for each process, the command line parameters are also recorded. The list is then filtered using a white-list of processes/thread handled by the operating system that are not under the direct control of the user application.

The integrity check is then based on the name of the process, the full path, the number of running instances and the command line used by them.

After the termination of the integrity checks, the controller client 107 runs (i.e. executes) all the executables contained in the application just installed. When the application is a graphical application, the controller client 107 emulates a user familiarizing with the application.

Typically, after having installed an application, users explore the menu and try to activate the various elements of the menu. This may also trigger some side-effects caused by the application itself. The interaction between the controller client 107 and the application is implemented using the controller 103 to gather the Graphical User Interface (GUI) state; in Windows Mobile™, it is possible to get detailed information about the various graphical elements of the GUI; in Symbian™, the possibility exists of collecting from the display the image to be analyzed locally to determine how many elements are present in the menu. In both platforms, the controller 103 can interact with the GUI by sending messages to the window manager, which is the operating system component responsible for the interaction between the GUI and the underlying services offered by the operating system.

By injecting operating system events in the window manager process, it is possible to emulate the actions corresponding to keys/buttons being pressed, menu activation and deactivation.

Figure 4:
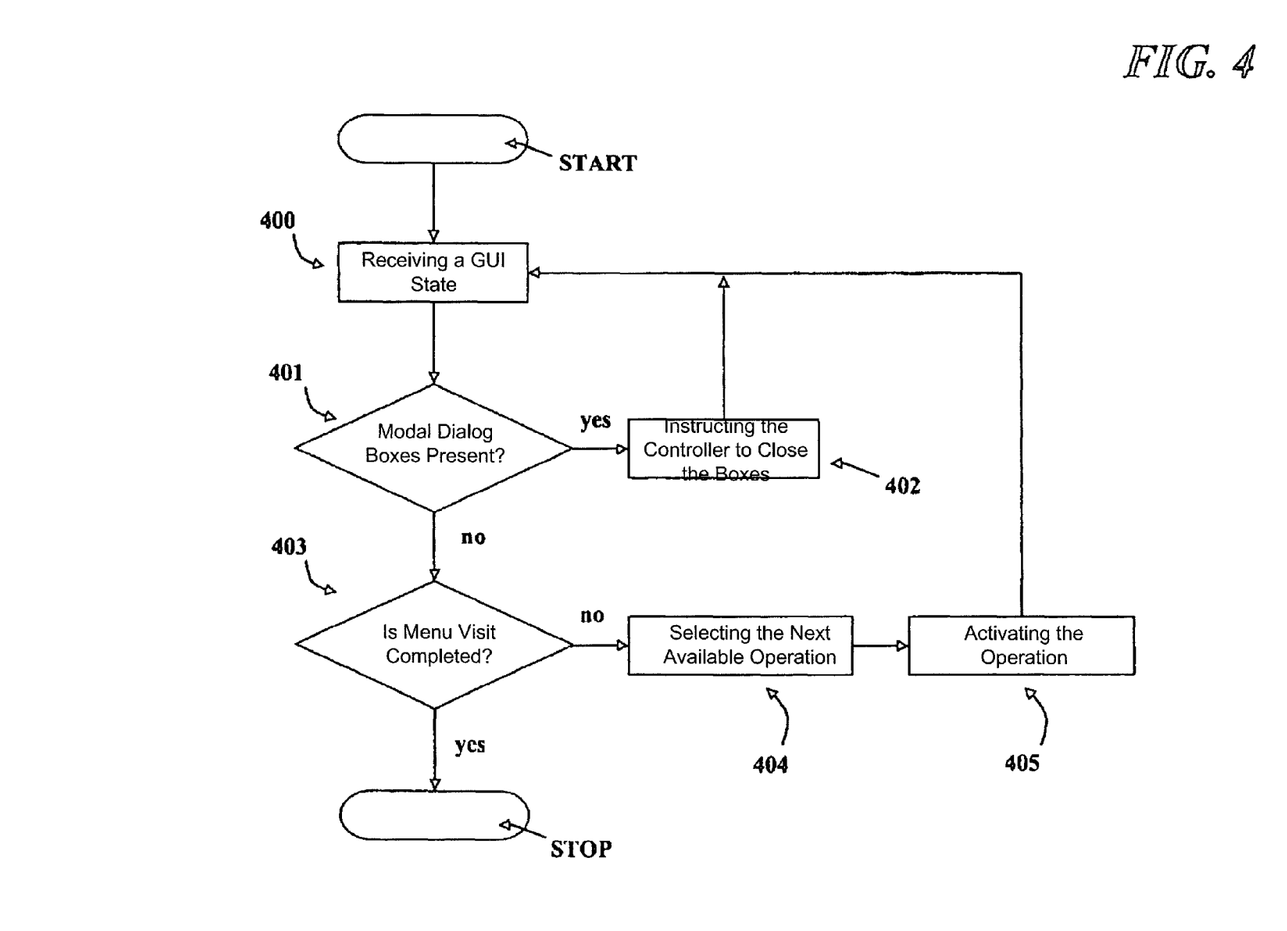

Using the facilities offered by the window manager, the controller 103 can interact with the menu following the procedure represented by the flow-chart of FIG. 4.

After a START step, in a step 400 the controller client 107 receives the GUI state from the controller 103, and starts to explore the GUI. In a step 401 a check is made as to whether modal dialog boxes exist that forbid the access to menu. If such boxes are present (positive outcome of the step 401), the controller client 107 asks the controller to close them, which occurs in a step 402 by injecting a "Press OK Button" event, or by directly closing the window if the former does not complete successfully in a limited amount of time.

If the step 401 yields a negative outcome, the procedure continues until the menu visit is concluded, which is checked in a step 403. If the visit is not yet concluded (i.e. there are still untested menu elements in the application, which leads to a negative outcome of the step 403), in a step 404 the controller client 107 selects the next available operation, activates it in a step 405, and then waits for a limited amount of time to see what happens.

After the time has expired, it checks again the GUI state (step 400) and the whole process starts again. If one of the menu elements causes the application exit or there are no extra elements to test, the menu analysis terminates (STOP step of FIG. 4).

After having run the executables contained in the application (and performing the integrity test(s) to check whether any of these executables have caused an anomalous variation in the state of the terminal 101—in which case a malware alerts is issued), the controller client 107 uninstalls the application and runs again the integrity tests e.g. on the file-system, the process set, and/or the used resource set of the terminal 101. If a difference (i.e. an anomalous variation) is detected, the controller client 107 issues an alert but also restores the original context, by deleting the extra files or killing the unwanted processes.

When a single application has been completely processed and the original state has been fully restored, the controller client 107 checks whether there are pending applications left. If no application is pending, the controller client 107 waits for a new application to arrive; otherwise, the controller client 107 continues to process application by extracting them from the pending application queue.

The exemplary embodiment described herein relies on some specific characteristics of the Symbian™ Operating System. Those of skill in the art will however appreciate that the arrangement described herein lends itself to alternative implementations adapted to different operating systems: the key characteristics exploited to create the monitor 104 and the controller 103 are in fact fairly general and generally present in other types of operating systems (e.g. Windows Mobile™ or PalmOS™, just to mention two examples). Different models of mobile devices or terminals 101, connected to the host 102 through channel 109, may be advantageously used, preferably based on different operating systems, so that software applications designed for particular terminals or brands may be easily detected by the system.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method of providing a honeypot function in a mobile communication network to protect the mobile communication network against malware, comprising:

monitoring events corresponding to applications in at least one mobile device, the at least one mobile device being user-less and operatively connected to a mobile communication network;

defining a set of anomalous variations in a state of said at least one mobile device, wherein the anomalous variations in the set of anomalous are indicative of said at least one mobile device being exposed to one or more risks of malware, the set of anomalous comprising:

overwriting, by one of the applications, existing files of other applications; and re-executing one of the applications at a booting of said at least one mobile device;

subjecting said at least one mobile device to the one or more risks by emulating a human-like interaction between a server and said at least one mobile device in accordance with said monitored events, wherein said human-like interaction comprises controllably performing, for the applications corresponding to said monitored events, a sequence comprising the steps of:

i) installing an application on said at least one mobile device;

ii) executing the application installed on said at least one mobile device; and iii) de-installing the application from said at least one mobile device;

checking, after any of the steps performed in said sequence, the state of said at least one mobile device to detect if any of said anomalous variations in said set of anomalous has occurred in the state of said at least one mobile device; and issuing a malware alert message in response to a detection of at least one of the said anomalous variations.

2. The method of claim 1, wherein said set of anomalous variations comprises an application executed on said at least one mobile device leading to:

the application invoking processes other than the executing processes;

the application accessing a SIM of said at least one mobile device;

the application accessing an address book of said at least one mobile device;

the application causing messages and/or calls to be issued automatically from said at least one mobile device; and the application prompting a short range wireless session.

3. The method of claim 1, wherein said set of anomalous variations comprises an application being de-installed from said at least one mobile device leading to the state of said at least one mobile device after de-installation being different from the state of said at least one mobile device prior to installation of said application.

4. The method of claim 1, wherein said state of said at least one mobile device is identified on the basis of at least one of a file-system, a list of executing processes, and the resources utilized by said at least one mobile device.

5. The method of claim 1, further comprising the steps of:

tagging said malware alert messages with identifiers associated with specific respective alerts; and correlating alerts that refer to a given application as a function of said identifiers.

6. The method of claim 1, further comprising the step of executing all executable programs contained in said applications installed in said at least one mobile device.

7. The method of claim 1, wherein, in case of a graphical application, comprising the step of gathering a graphical user interface associated therewith to determine elements in an application menu.

8. The method of claim 1, wherein the operation of emulating comprises the step of injecting into an operating system of said at least one mobile device, operating system events, key/buttons being pressed, menu activation and deactivation.

9. The method of claim 1, wherein, if said at least one mobile device becomes unresponsive, comprising an operation selected from:

soft resetting said at least one mobile device;

hard resetting said at least one mobile device via a switch connected to the battery thereof; and applying a predefined control sequence to said at least one mobile device.

10. The method of claim 9, wherein said soft resetting of said at least one mobile device comprises automatically activating functions stored in a protected external memory card.

11. A honeypot system for protecting a mobile communication network against malware, comprising:

at least one mobile device operatively connectable to said network, said mobile device comprising a first memory for storing program codes providing a monitoring module for monitoring events conveying applications in said mobile device and a controller module for collecting the events monitored by said monitoring module, and said mobile device is user-less, the first memory further storing definitions of a set of anomalous variations in a state of the at least one mobile device, the set of anomalous comprising:

overwriting, by one of the applications, existing files of other applications; and re-executing one of the applications at a booting of said at least one mobile device; and a computer host comprising a second memory for storing program codes providing a controller client module for subjecting said at least one mobile device to one or more risks of malware by emulating a human-like interaction between the computer host and said at least one mobile device in accordance with said collected events, wherein said human-like interaction comprises controllably performing, for the applications conveyed by said collected events, a sequence comprising the steps of:

i) installing an application on said at least one mobile device;

ii) executing the application installed on said at least one mobile device; and iii) de-installing the application from said at least one mobile device;

the controller client module further checking, after any of the steps performed in said sequence, a state of said at least one mobile device to detect if any one of the anomalous variations has occurred in the state of said at least one mobile device indicative of said at least one mobile device being exposed to the risks of malware, and issuing a malware alert message in response to a detection of at least one of the anomalous variations.

12. The system of claim 11, wherein any said anomalous variation comprises an application executed on said at least one mobile device leading to:

the application invoking processes other than executing processes;

the application accessing a SIM of said at least one mobile device;

the application accessing an address book of said at least one mobile device;

the application causing messages and/or calls to be issued automatically from at least one mobile device; and the application prompting a short range wireless session.

13. The system of claim 11, wherein said set of anomalous variations comprises an application being de-installed from said at least one mobile device leading to a state of said at least one mobile device after de-installation being different from a state of said at least one mobile device prior to installation of said application.

14. The system of claim 11, wherein said state of said at least one mobile device is identified on the basis of at least one of a file-system, a list of executing processes, and resources utilized by said at least one mobile device.

15. The system of claim 11, wherein said controller client module is configured for running all executable programs contained in applications installed in said at least one mobile device.

16. The system of claim 11 comprising a configuration for gathering, in the case of a graphical application, a graphical user interface associated therewith to determine elements in an application menu.

17. The system of claim 11, wherein said controller client module configured for injecting into the operating system of said at least one mobile device, operating system events, keys/buttons being pressed, menu activation and deactivation.

18. The system of claim 11, comprising a configuration for performing, if said at least one mobile device becomes unresponsive, an operation selected from:
   soft resetting said at least one mobile device;
   hard resetting said at least one mobile device via a switch connected to the battery thereof; and
   applying a predefined control sequence to said at least one mobile device.

19. The system of claim 18, wherein said soft resetting of said at least one mobile device comprises automatically activating functions stored in a protected external memory card.

20. The system of claim 11, wherein said controller module and said controller client module support synchronous communication where:
   the controller client module is the initiator sending commands to the controller module; and
   the controller module is a responder sending explicit responses to commands from the controller client module.

21. The system of claim 11, comprising a plurality of mobile devices, said mobile devices being provided with different operating systems.

22. A mobile communication network comprising a honeypot system for protecting a mobile communication network against malware, the honeypot system comprising:
   at least one mobile device operatively connectable to said network, said mobile device comprising a first memory for storing program codes providing a monitoring module for monitoring events conveying applications in said mobile device and a controller module for collecting the events monitored by said monitoring module, and said mobile device is user-less, the first memory further storing definitions of a set of anomalous variations in a state of the at least one mobile device, the set of anomalous comprising:
      overwriting, by one of the applications, existing files of other applications; and
      re-executing one of the applications at a booting of said at least one mobile device; and
   a computer host comprising a second memory for storing program codes providing a controller client module for subjecting said at least one mobile device to one or more risks of malware by emulating a human-like interaction between the computer host and said at least one mobile device in accordance with said collected events, wherein said human-like interaction comprises controllably performing, for the applications conveyed by said collected events, a sequence comprising the steps of:
      i) installing an application on said at least one mobile device;
      ii) executing the application installed on said at least one mobile device; and
      iii) de-installing the application from said at least one mobile device:
   the controller client module further checking, after any of the steps performed in said sequence, a state of said at least one mobile device to detect if any one of the anomalous variations has occurred in the state of said at least one mobile device indicative of said at least one mobile device being exposed to the risks of malware, and issuing a malware alert message in response to a detection of at least one of the anomalous variations.

23. A non-transitory computer-readable medium comprising program code, which, when executed by a computer, cause the computer to perform a method for providing a honeypot function in a mobile communication network to protect the mobile communication network against malware, the method comprising:
   monitoring events corresponding to applications in at least one mobile device, the at least one mobile device being user-less and operatively connected to a mobile communication network;
   defining a set of anomalous variations in a state of said at least one mobile device, wherein the anomalous variations in the set of anomalous are indicative of said at least one mobile device being exposed to one or more risks of malware, the set of anomalous comprising:
      overwriting, by one of the applications, existing files of other applications; and
      re-executing one of the applications at a booting of said at least one mobile device;
   subjecting said at least one mobile device to the one or more risks by emulating a human-like interaction between a server and said at least one mobile device in accordance with said monitored events, wherein said human-like interaction comprises controllably performing, for the applications corresponding to said monitored events, a sequence comprising the steps of:
      i) installing an application on said at least one mobile device;
      ii) executing the application installed on said at least one mobile device; and
      iii) de-installing the application from said at least one mobile device;
   checking, after any of the steps performed in said sequence, the state of said at least one mobile device to detect if any of said anomalous variations in said set of anomalous has occurred in the state of said at least one mobile device; and
   issuing a malware alert message in response to a detection of at least one of the said anomalous variations.

* * * * *

UNITED STATES PATENT AND TRADEMARK OFFICE
CERTIFICATE OF CORRECTION

PATENT NO. : 8,443,439 B2  Page 1 of 1
APPLICATION NO. : 12/225686
DATED : May 14, 2013
INVENTOR(S) : Gerardo Lamastra et al.

It is certified that error appears in the above-identified patent and that said Letters Patent is hereby corrected as shown below:

In the Claims

Claim 1, col. 13, line 7, "set of anomalous" should read as --set of anomalous variations--.

Claim 1, col. 13, line 9, "set of anomalous" should read as --set of anomalous variations--.

Claim 1, col. 13, line 29, "set of anomalous" should read as --set of anomalous variations--.

Claim 11, col. 14, line 27, "set of anomalous" should read as --set of anomalous variations--.

Claim 22, col. 15, line 58, "set of anomalous" should read as --set of anomalous variations--.

Claim 23, col. 16, line 35, "set of anomalous" should read as --set of anomalous variations--.

Claim 23, col. 16, line 37, "set of anomalous" should read as --set of anomalous variations--.

Claim 23, col. 16, line 57, "set of anomalous" should read as --set of anomalous variations--.

Signed and Sealed this
Twenty-ninth Day of October, 2013

Teresa Stanek Rea
*Deputy Director of the United States Patent and Trademark Office*